(12) United States Patent  
Supino et al.

(10) Patent No.: US 7,724,610 B2  
(45) Date of Patent: May 25, 2010

(54) ULTRASONIC MULTILATERATION SYSTEM FOR STRIDE VECTORING

(75) Inventors: Ryan Supino, Loretto, MN (US); Robert D. Horning, Savage, MN (US)

(73) Assignee: Honeywell International Inc., Morristown, NJ (US)

( * ) Notice: Subject to any disclaimer, the term of this patent is extended or adjusted under 35 U.S.C. 154(b) by 128 days.

(21) Appl. No.: 12/019,380

(22) Filed: Jan. 24, 2008

(65) Prior Publication Data

US 2009/0073045 A1 Mar. 19, 2009

Related U.S. Application Data

(60) Provisional application No. 60/973,341, filed on Sep. 18, 2007.

(51) Int. Cl.
*G01S 3/80* (2006.01)
(52) U.S. Cl. .................................................. 367/118
(58) Field of Classification Search ............... 367/118, 367/128
See application file for complete search history.

(56) References Cited

U.S. PATENT DOCUMENTS

2004/0095276 A1    5/2004    Krumm et al.
2009/0073045 A1*   3/2009    Supino et al. ............... 342/463

FOREIGN PATENT DOCUMENTS

| DE | 10310857 | 9/2004 |
|---|---|---|
| EP | 1022583 | 7/2000 |
| FR | 2853221 | 10/2004 |
| GB | 2332052 | 6/1999 |
| WO | 03062850 | 7/2003 |

OTHER PUBLICATIONS

Saarinen et al., "Personal Navigation System", Sep. 2004, Proceedings of the 2004 IEEE/RSJ International Conference on Intelligent Robots and Systems, vol. 1, pp. 212-217.*
European Patent Office, "European Search Report", Jan. 31, 2009, Published in: EP.
Brand et al., "Foot-to-Foot Range Measnurement as an Aid to Personal Navigation", "CIGTF 22nd Guidance Test Symposium", Jun. 23-25, 2003, pp. 113-121, Publisher: ION 59th Annual Meeting, Published in: Albuquerque, NM US.
Bronez, Thomas, "Mulitsensor Dead Reckoning for Personal Navigation", "2007 WPI PPL Workshop", Aug. 6, 2007, Publisher: MITRE Technology Program.

* cited by examiner

*Primary Examiner*—Dan Pihulic
(74) *Attorney, Agent, or Firm*—Fogg & Powers LLC

(57) ABSTRACT

A lateration system comprising at least one transmitter attached to a first object and configured to emit pulses, three or more receivers attached to at least one second object and configured to receive the pulses emitted by the transmitter, and a processor configured to process information received from the three or more receivers, and to generate a vector based on lateration. Lateration is one of multilateration and trilateration. The vector is used by the processor to constrain error growth in a navigation solution.

20 Claims, 10 Drawing Sheets

$$\tau_L = T_L - T_C = \frac{1}{c_s}\left(\sqrt{(x-x_L)^2+(y-y_L)^2+(z-z_L)^2}-\sqrt{x^2+y^2+z^2}\right)$$

$$\tau_R = T_R - T_C = \frac{1}{c_s}\left(\sqrt{(x-x_R)^2+(y-y_R)^2+(z-z_R)^2}-\sqrt{x^2+y^2+z^2}\right)$$

$$\tau_B = T_B - T_C = \frac{1}{c_s}\left(\sqrt{(x-x_B)^2+(y-y_B)^2+(z-z_B)^2}-\sqrt{x^2+y^2+z^2}\right)$$

$c_s$: SPEED OF WAVE PROPAGATION

ULTRASONIC MULTILATERATION SYSTEM FOR STRIDE VECTORING

This application claims the benefit of priority to U.S. Provisional Patent Application Ser. No. 60/973,341, filed on Sep. 18, 2007, the disclosure of which is incorporated herein by reference.

CROSS-REFERENCE TO RELATED APPLICATIONS

This application is related to copending U.S. application Ser. No.12/019,368, and entitled "METHOD OF PERSONAL NAVIGATION USING STRIDE VECTORING," the disclosure of which is incorporated herein by reference.

This application is also related to copending U.S. application Ser. No. 12/019,368, and entitled "GROUND CONTACT SWITCH FOR PERSONAL NAVIGATION SYSTEM," the disclosure of which is incorporated herein by reference.

BACKGROUND

Personal navigation systems capable of providing highly accurate location information in global positioning system (GPS) denied environments or GPS-disrupted environments are sought after for military, first responder, and consumer applications. These personal navigation systems need to provide accurate position information when GPS is unavailable or unreliable for long periods of time (e.g., hours to days). GPS interruption can occur due to GPS line-of-sight blockage (e.g., buildings, forest canopy, caves, etc.) or due to electrical interference/jamming.

Typically, personal navigation systems use an inertial measurement unit (IMU), or some subset of inertial sensors, to measure changes in position and heading to track the movement of a person, ground vehicle, or air vehicle. Since inertial measurement unit errors accumulate rapidly, additional sensors such as a compass, pressure sensor, or velocity sensors are added to constrain error growth and drift. Furthermore, algorithms based on motion classification or zero velocity update (ZUPT) are used to compensate and constrain distance error growth, but do not adequately constrain heading error. In order to limit the heading error a compass is often used, however, compass accuracy still limits position performance and is inadequate for long, precise GPS-denied missions. Vision-based systems, using either optical flow or image/landmark recognition, can compensate for heading error, but tend to be computationally demanding.

Personal dead reckoning systems for navigating in GPS-denied environments have also been developed. Such systems, which are based on a fusion of inertial sensors, a compass, and a pressure sensor, are limited in accuracy to about 1-5% error over distance traveled. Distance error typically accounts for about 30% of total position error and heading error accounts for about 70% of the total position error.

SUMMARY

The present invention relates to lateration system that comprises at least one transmitter attached to a first object and configured to emit pulses, three or more receivers attached to at least one second object and configured to receive the pulses emitted by the transmitter, and a processor configured to process information received from the three or more receivers. The processor is also configured to generate a vector based on lateration. Lateration is multilateration or trilateration. The generated vector is used by the processor to constrain error growth in a position measurement system.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
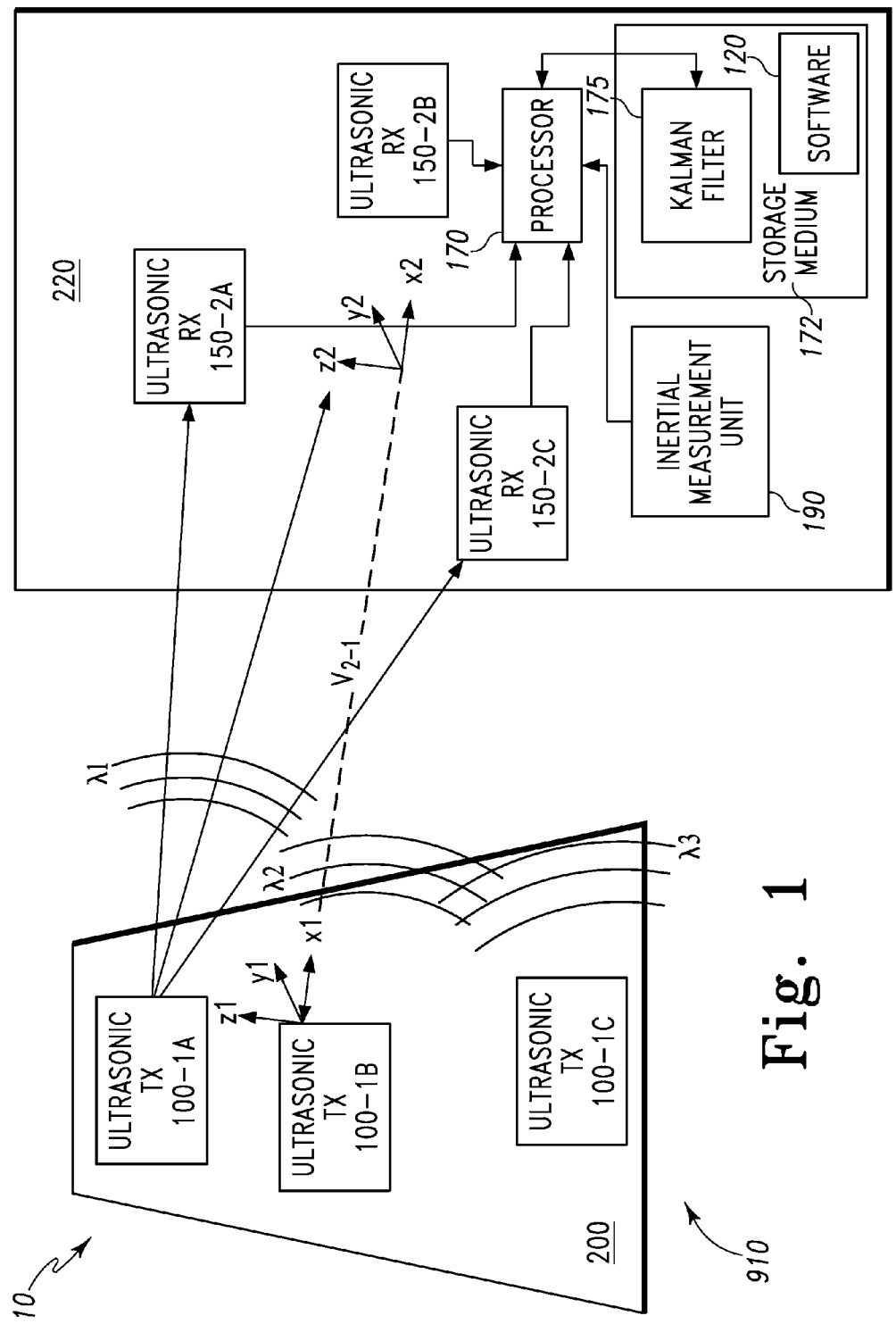
FIG. 1 illustrates an ultrasonic unidirectional trilateration system attached to a first and second object according to one embodiment.

In the following detailed description, embodiments are described in sufficient detail to enable those skilled in the art to practice the invention. It is to be understood that other embodiments may be utilized without departing from the scope of the present invention. The following detailed description is, therefore, not to be taken as limiting.

The present invention is related to an ultrasonic lateration system in a position measurement system that is used to perform a stride vectoring technique or to monitor the relative positions between robotic units that are moving as a group within in a robotic system. The ultrasonic lateration system generally includes a network of ultrasonic receivers and at least one ultrasonic transmitter. The ultrasonic lateration system is used to measure a position vector between objects (such as items of footwear or robotic units) during movements. In some embodiments described herein, the position measurement system comprises a personal navigation system. In other embodiments described herein, the position measurement system comprises a robotic system that includes a plurality of robotic units.

In one implementation of this embodiment, the network of ultrasonic receivers and ultrasonic transmitter(s) is embedded in footwear to determine the position of one foot with respect to the other foot. In another implementation of this embodiment, the network of ultrasonic receivers and ultrasonic transmitter(s) is embedded in footwear to determine the position of one foot with respect to the other foot and to determine foot orientation. The lateration system can also be used in navigation systems for robots that "walk" such as humanoid robots. For example, transmitters, receivers, and IMUs can be incorporated directly into the structure of robot feet as part of the navigation system for the robot.

In yet another implementation, the lateration system is embedded in robotic units to determine the position of a first robotic unit with respect to a second and/or third robotic unit, as the robotic units move in a group in the same general direction. In this implementation, the lateration system may be a radio frequency lateration system or an optical lateration system as is understandable based on a reading of this specification.

For a personal navigation system, as one foot is stationary, multiple position updates can be made throughout the stride of the moving foot to measure the relative position ($\Delta x$, $\Delta y$, $\Delta z$) of one foot with respect to the other. This position information can be used to perform stride vectoring for inertial measurement unit compensation in the personal navigation system, thereby constraining the heading error growth of the inertial measurement unit (IMU).

In stride vectoring, a position vector between a user's feet is measured at one time or multiple times per step. Since the position vector provides both distance and direction, it can compensate for inertial measurement unit heading error as well as distance error, providing significant improvement in performance of personal navigation systems in GPS-denied environments. Thus, the location of the user can be known in GPS-denied environments when the lateration system is implemented in a personal navigation system.

The present lateration system can be used in position measurement systems for both military and civilian applications. In one implementation of this embodiment, the position measurement system measures the relative position between two or more objects. For a first example, the position measurement system measures relative positions of objects that are swarming. For a second example, the position measurement system is a personal navigation system used to measure vectors between feet on a person wearing the personal navigation system. In this case, the lateration system can be used in a personal navigation system for soldiers, first responder personnel (e.g., fire, rescue, and police), consumer applications, and the like. In some embodiments, the personal navigation systems measures absolute position of an object. For example, the personal navigation system is used to measure the absolute position of an item of footwear on a person wearing the personal navigation system in order to determine the location of a person who is walking around in an environment that restricts input from a global positioning system.

In one embodiment, one item of footwear (e.g., a first boot in a pair of boots) has an ultrasonic transmitter embedded therein, and the other item of footwear (e.g., second boot in the pair of boots) has a network of embedded ultrasonic receivers. In this embodiment, the transmission is unidirectional. In another embodiment, both items of footwear (e.g., pair of boots) have an ultrasonic transmitter and a network of ultrasonic receivers, with the transmitter in each item of footwear configured to communicate with the receivers in the other item of footwear. In this embodiment, the transmission is bidirectional. The ultrasonic receivers can determine position of the ultrasonic transmitter in three dimensions to within a few millimeters using time-of-arrival or time-difference-of-arrival measurements of the transmitted pulse. A bidirectional lateration system can determine the orientation of the items of footwear.

Three or more receivers can be used in the present personal navigation system to measure the position of one foot of a user with respect to the other foot. When three receivers are employed in the present personal navigation system, the designation "trilateration" is used herein. In a unidirectional trilateration implementation of the present personal navigation system according to one embodiment, one item of footwear is mounted with an ultrasonic transmitter, and the other item of footwear is mounted with a network of three ultrasonic receivers. In a bidirectional trilateration implementation of the present personal navigation system according to one embodiment, both items of footwear are mounted with an ultrasonic transmitter, and the both items of footwear are mounted with a network of three receivers. In one implementation of this embodiment, the three ultrasonic receivers are located on the item of footwear in a non-co-linear manner.

Each transmitter is configured to emit an ultrasonic pulse that is detected by the three or more ultrasonic receivers on the other item of footwear. Time-of-arrival (TOA) measurements are made to determine the time taken for the ultrasonic pulses to propagate from the transmitter and to each of the three or more receivers. The measured time-of-arrival for each pulse received at the ultrasonic receiver is based on the distance the ultrasonic pulse propagates divided by the propagation speed of the ultrasonic pulse. The distance the ultrasonic pulse propagates represents a radius for a sphere centered on the ultrasonic transmitter. Typically, each of the three or more ultrasonic receivers is at a different distance from the ultrasonic transmitter during the stride so the three or more radii are representative of three or more spheres centered about the ultrasonic transmitter. The intersection of these spheres isolates the transmitter at a position in three dimensional space with respect to the center of the receiver network, thus trilateration is used to generate a position vector. The position of the receiver with respect to the transmitter is monitored over time, and includes both rotation and translation information. To perform a trilateration measurement, the receiver and transmitter are synchronized in some manner, such as by using a wireless radio frequency (RF) trigger signal.

A multilateration implementation has a network of four or more non-colinear receivers and uses time-difference-of-arrival (TDOA) measurements between receiver pairs to generate a position vector. The TDOA measurements between pairs of receivers locate the transmitter on a hyperboloid surface, instead of a spherical surface as in the case of the trilateration implementation. The four or more receivers are paired together, with one receiver being common to all pairs. The TDOA between the common receiver and another receiver locates the transmitter on a hyperboloid surface. The intersection of the three hyperboloid surfaces indicates the position of the transmitter in three dimensional space with respect to the common receiver in the pairs of receivers.

A multilateration implementation has the advantage of eliminating the need to synchronize the receivers with the transmitter, but somewhat increases the computational requirements of calculating a position solution. Additionally, the time scale of TDOA measurements is smaller than the TOA measurements used in trilateration, which can possibly increase the electronics requirements. In either implementation, the roles of the receivers and transmitter may be reversed preserving the same position measurement capability. Additional receivers and transmitters may also be used to provide measurement redundancy to increase the accuracy of the system.

The receiver network may be interconnected with simple wiring, or a wireless system can be employed using RF encoded with ultrasonic signals, or specifically encoded ultrasonic pulses, to discriminate between receivers and transmitters.

The present ultrasonic lateration system is described hereafter in further detail with respect to the drawings. FIG. 1 illustrates an ultrasonic unidirectional trilateration system 10 attached to a first object 200 and second object 220 according to one embodiment. The position measurement system 910 includes the ultrasonic unidirectional trilateration system 10, the first object 200, and the second object 220. The first object 200 and the second object 220 each have a local coordinate system $(x_1, y_1, z_1)$ and $(x_2, y_2, z_2)$, respectively. The vector $V_{2-1}$ (also referred to herein as first vector $V_{2-1}$) is directed from the origin of the $(x_2, y_2, z_2)$ coordinate system to a transmitter in the coordinate system $(x_1, y_1, z_1)$ and is indicative of the position of the first object 200 relative to the second object 220.

The ultrasonic unidirectional trilateration system 10 includes a first, a second, and a third ultrasonic transmitter 100-1(A-C), respectively, that are each attached to the first object 200 and that each emit pulses. Specifically, the first, second, and third ultrasonic transmitter 100-1(A-C) each emit ultrasonic pulses having a first wavelength $\lambda_1$, second wavelength $\lambda_2$, and third wavelength $\lambda_3$, respectively. The ultrasonic unidirectional trilateration system 10 also includes first, second, and third receivers 150-2(A-C), respectively, each attached to the second object 220 and each configured to receive the pulses emitted by the respective first, second, and third ultrasonic transmitters 100-1(A-C). Each of the receivers first, second, and third receivers 150-2(A-C) detects the pulses from all of the first, second, and third ultrasonic transmitters 100-1(A-C) as represented generally by the three arrows directed from the ultrasonic transmitter 100-1A to the first, second, and third receivers 150-2(A-C), respectively. The first ultrasonic receiver 150-2A, the second ultrasonic receiver 150-2B, and the third ultrasonic receiver 150-2C each receives the first wavelength $\lambda_1$ ultrasonic pulse, the second wavelength $\lambda_2$ ultrasonic pulse, and the third wavelength $\lambda_3$ ultrasonic pulse. The first, second, and third receivers 150-2(A-C) can distinguish which pulse is emitted from which ultrasonic transmitter 100-1(A-C) and a time of flight for each wavelength is determined at each of the first, second, and third receivers 150-2(A-C).

The dispersive effects of the environment, such as temperature, pressure or humidity, on the path of propagation of the ultrasonic pulses between the transmitters 100-1(A-C) and the receivers 150-2(A-C), differ for each of the wavelengths, so the propagation velocities $c_{s1}$, $c_{s3}$, and $c_{s3}$ of the ultrasonic pulses at the first wavelength $\lambda_1$, the second wavelength $\lambda_2$, and the third wavelength $\lambda_3$, respectively, are slightly different based on the local environmental. The differences in the time of arrive for each wavelength is used to accurately determine the propagation velocity for the given local environment, and therefore to calculate a more precise vector. Thus, the ultrasonic unidirectional trilateration system 10 shown in FIG. 1 is accurate for various environments.

In one implementation of this embodiment, there is only one ultrasonic transmitter 100 in the ultrasonic unidirectional trilateration system. Such an implementation is described below with reference to FIG. 2. As shown in FIG. 1, the first, second, and third ultrasonic transmitters 100-1(A-C) are not co-linear.

In another such embodiment, the first, second, and third ultrasonic transmitters 100-1(A-C) and the first, second, and third receivers 150-2(A-C) use coding schemes such as code division multiple access or pseudo-random noise coding to distinguish the pulses emitted from the first, second, and third ultrasonic transmitters 100-1(A-C). Coding schemes will help eliminate interference between different ultrasonic lateration systems that are in proximity to one another. In yet another such embodiment, the different transmitters can emit the ultrasonic pulse at slightly different times for a time division multiple access or time division multiplexing based system. In this case, each transmitter sends a pulse at a slightly different time, and the receivers are programmed to recognize the pulse order and to recognize which pulse is an associated pulse.

A processor 170 is communicatively coupled to the first, second, and third ultrasonic receivers 150-2(A-C), an inertial measurement unit 190. The processor 170 executes a Kalman filter 175 stored on storage medium 172. The first, second, and third ultrasonic receivers 150-2(A-C) send information indicative of TOA or receive-times of the ultrasonic pulse at the respective receivers 150-2(A-C) to the processor 170. The processor 170 is configured to process the information received from the first, second, and third ultrasonic receivers 150-2(A-C), and to generate the vector $V_{2-1}$ based on trilateration. The vector $V_{2-1}$ is used by the Kalman Filter 175 to constrain error growth in the measurement of a position at $(x_1, y_1, z_1)$ and a heading (typically with respect to a direction such as true North) of the first object 200 that are made by the inertial measurement unit 190.

The inertial measurement unit 190 outputs information indicative of a change in position and a change in heading of the inertial measurement unit 190 to the Kalman Filter 175. The trilateration system generates a navigation solution based on the generated vector $V_{2-1}$ and the information indicative of a change in position and a change in heading.

The processor 170 processes the vector information and the information indicative of a change in position and a change in heading through the Kalman filter 175. The Kalman filter 175 is stored on storage medium 172 and filters vector information with the information indicative of a change in position and a change in heading to generate corrections to the navigation solution.

In one implementation of this embodiment, the processor 170 executes Kalman filter 175 so that the output from the inertial measurement unit 190 constrains error growth in the generation of the vector $V_{2-1}$. In another implementation of this embodiment, the processor 170 executes Kalman filter 175 so that the generation of the vector $V_{2-1}$ constrains error growth in the output from the inertial measurement unit 190.

In one implementation of this embodiment, the inertial measurement unit 190 is attached to the first object 200. In another implementation of this embodiment, the first object 200 is a first item of footwear and the second object 220 is the second item of footwear that are each being worn by a user of the system 10. In this case, the inertial measurement unit 190 can be worn by the user and is not necessarily attached to either the first object 200 or the second object 220.

The processor 170 is communicatively coupled to the first, second, and third ultrasonic receivers 150-2(A-C) and an inertial measurement unit 190 by one or more of a wireless communication link (for example, a radio-frequency (RF) communication link) and/or a wired communication link (for example, an optical fiber or copper wire communication link).

At least a portion of the Kalman filter 175 executed by the processor 170 is stored in storage medium 172 during execution. In one implementation, the processor 170 comprises a microprocessor or microcontroller. In one implementation of this embodiment, the processor 170 includes a memory (not shown). In one implementation, the processor 170 comprises processor support chips and/or system support chips such as application-specific integrated circuits (ASICs).

Figure 2:
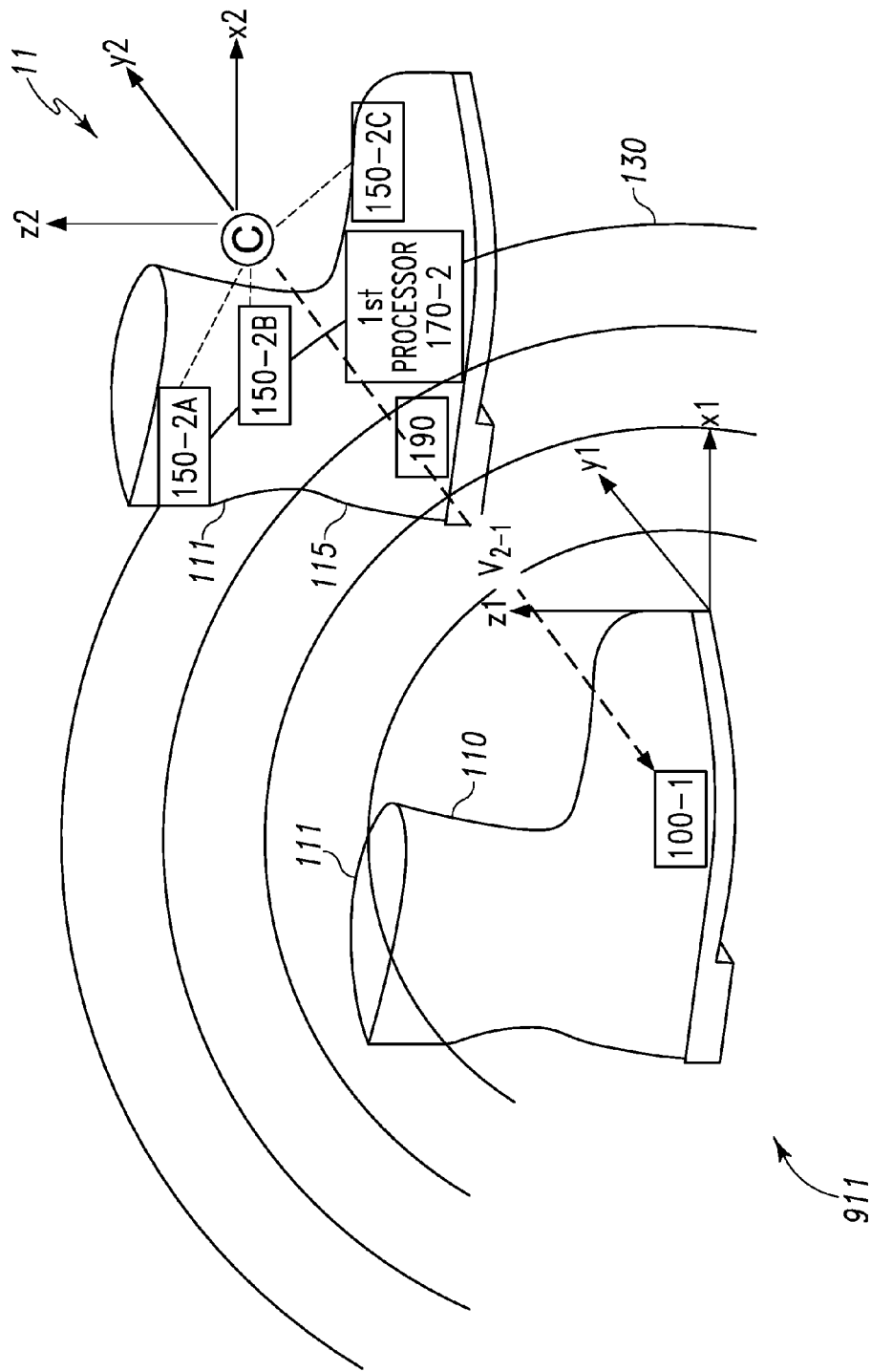
FIG. 2 illustrates a unidirectional personal navigation system for stride vectoring according to one embodiment.

FIG. 2 illustrates a unidirectional personal navigation system 11 for stride vectoring according to one embodiment. The ultrasonic transmitter and ultrasonic receivers in FIG. 2 correspond to the embedded transmitters and receivers of FIG. 1, except there is only one transmitter and all three ultrasonic receivers detect the pulse emitted by the single ultrasonic transmitter 100-1A. The personal navigation system 11 (also referred to herein as an ultrasonic unidirectional trilateration system 11) is attached to a pair of footwear 111 that includes a first item of footwear 110 and a second item of footwear 115. The position measurement system 911 includes the personal navigation system 11, and the pair of footwear 111.

The second item of footwear 115 (also referred to herein as left boot 115) is embedded with three non-collinear ultrasonic receivers 150-2(A-C). The first item of footwear 110 (also referred to herein as right boot 110) is embedded with an ultrasonic transmitter 100-1 in operative communication with the ultrasonic receivers 150-2(A-C). In an alternative embodiment, the left boot 115 is embedded with the ultrasonic transmitter 100-1 and the right boot 110 is embedded with the ultrasonic receivers 150-2(A-C).

During operation of ultrasonic unidirectional trilateration system 11, the transmitter 100-1 emits ultrasonic pulses having wavefronts represented generally by the numeral 130 that propagate with a velocity $c_s$ to each of ultrasonic receivers 150-2(A-C). The ultrasonic pulse is detected by each ultrasonic receiver 150-2(A-C). The time-of-arrival (TOA) of the ultrasonic pulse at each ultrasonic receiver 150-2(A-C) is determined based on a synchronization between the ultrasonic transmitter 100-1 and each ultrasonic receiver 150-2(A-C). In one implementation of this embodiment, the receivers 150-2(A-C) and transmitter 100-1 are synchronized by a wireless radio frequency (RF) trigger signal. Each ultrasonic receiver 150-2(A-C) sends the information indicative of the TOA of the ultrasonic pulse to the processor 170-2 (also referred to herein as first processor 170-2) on the second item of footwear 115. The processor 170-2 uses the information indicative of the three TOA received from each ultrasonic receiver 150-2(A-C) to generate a vector $V_{2-1}$ (also referred to herein as first vector $V_{2-1}$) that points from the center C of the receiver network (i.e., ultrasonic receivers 150-2(A-C)) on the second item of footwear 115 to the transmitter 100-1 on the first item of footwear 110. In one implementation of this embodiment, the Kalman filter (FIG. 1) uses information indicative of the vector $V_{2-1}$ to send corrections to the navigation solution to the processor 170-2.

The measured TOA for each pulse received at the ultrasonic receiver is based on the propagation distance of the ultrasonic pulse (i.e., the distance between the transmitter 100-1 and receiver 150-2A, 150-2B, or 150-2C) divided by the propagation velocity $c_s$ of the ultrasonic pulse. Typically, each of the three ultrasonic receivers 150-2A, 150-2B, or 150-2C is at a different distance from the ultrasonic transmitter 100-1 during the stride. The propagation distance of the ultrasonic pulse represents a radius for a sphere centered on the ultrasonic transmitter 100-1. The three TOA values produce three distinct spheres in space, and the intersection of these spheres indicates the position of the transmitter 100-1 in three dimensional space with respect to the center C of the receiver network.

Figure 3:
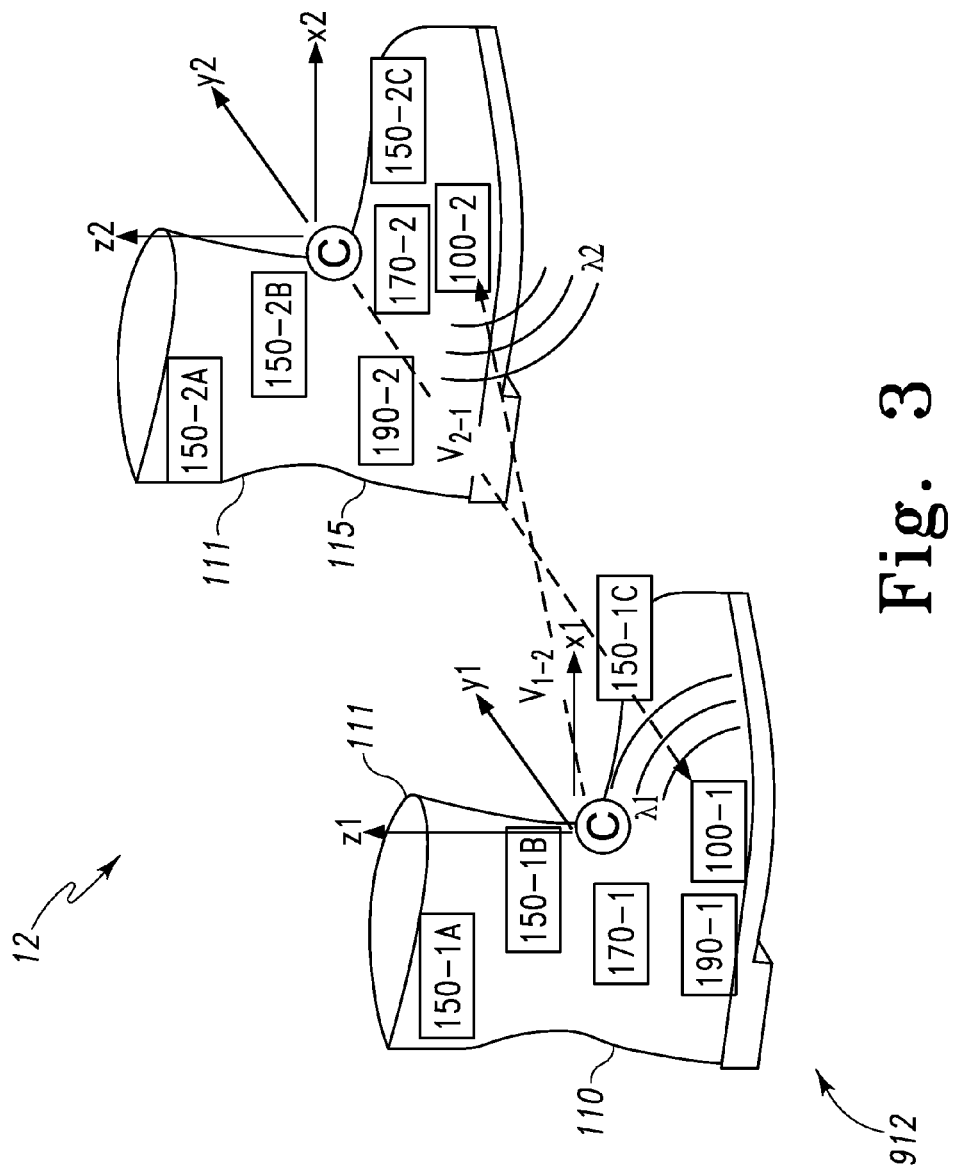
FIG. 3 illustrates a bidirectional personal navigation system for stride vectoring and determination of footwear orientation according to one embodiment.

FIG. 3 illustrates a bidirectional personal navigation system 12 for stride vectoring and determination of footwear orientation according to one embodiment. The bidirectional personal navigation system 12 differs from the unidirectional personal navigation system 11 described above with reference to FIG. 2 in that the left boot 115 and the right boot 110 are embedded with ultrasonic transmitters 100-2 and 100-1, respectively, and a network of three ultrasonic receivers 150-2(A-C) and 150-1(A-C), respectively. The position measurement system 912 includes the bidirectional personal navigation system 12 and the pair of footwear 111.

The first ultrasonic transmitter 100-2 is attached to the second item of footwear 115. The inertial measurement unit 190 of FIG. 2 is shown in FIG. 3 as a first inertial measurement unit 190-2. The second ultrasonic transmitter 100-1 and the second inertial measurement unit 190-1 are attached to the first item of footwear 110. The first ultrasonic transmitter 100-2 and the second ultrasonic transmitter 100-1 each emit ultrasonic pulses, which are received by the ultrasonic receivers 150-1(A-C) and additional ultrasonic receivers 150-2(A-C), respectively. The second processor 170-1 is communicatively coupled to the additional ultrasonic receivers 150-1(A-C) and the second inertial measurement unit 190-1 in the manner described above with reference to FIG. 1. The first processor 170-2 is attached to the second item of footwear 115 and is communicatively coupled to the ultrasonic receivers 150-2(A-C) and the first inertial measurement unit 190-2.

The second processor 170-1 on first item of footwear 110 uses the information indicative of the three TOA received from the three ultrasonic receivers 150-1(A-C) to generate a second vector $V_{1-2}$ that points from the first item of footwear 110 to the second transmitter 100-2 on the second item of footwear 115. In one implementation of this embodiment, the Kalman filter (FIG. 1) uses information indicative of the second vector $V_{1-2}$ to generate corrections to the navigation solution and to send the corrections to the second processor 170-1. The second vector $V_{1-2}$ is indicative of the position of the second item of footwear 115 relative to the first item of footwear 110. The second vector $V_{1-2}$ is used by the second processor 170-1 to constrain error growth in the measurement of a position and a heading of the second item of footwear 115.

In one implementation of this embodiment, the second processor 170-1 is not included in the bidirectional personal navigation system 12. In this case, the output from the additional ultrasonic receivers 150-1(A-C) is sent to the first processor 170-2 by a wired or wireless communication link and the first processor 170-2 performs the operations described above. In one implementation of this embodiment, the first processor 170-2 is not embedded in either the first item of footwear 110 or the second item of footwear 115 but is positioned elsewhere on the user of the footwear 111.

The first processor 170-2 on the second item of footwear 115 uses the information indicative of the three TOA received from the three ultrasonic receivers 150-2(A-C) to generate the first vector $V_{2-1}$ based on trilateration as described above with reference to FIG. 2.

The first vector $V_{2-1}$ and the second vector $V_{1-2}$ are used by at least one of the first processor 170-2 and the second processor 170-1 to determine an orientation of the first item of footwear 110 and/or the second item of footwear 115. In one implementation of this embodiment, the information indicative of the first vector $V_{2-1}$ is sent from the second item of footwear 115 to the first item of footwear 110 by a radio frequency transceiver system and the second processor 170-1 determines the orientation of the first item of footwear 110 with respect to the second item of footwear 115. In another implementation of this embodiment, the information indicative of the second vector $V_{1-2}$ is sent from the first item of footwear 110 to the second item of footwear 115 by a radio frequency transceiver system and the first processor 170-2 determines the orientation of the second item of footwear 115 with respect to the first item of footwear 110.

This orientation can be determined since local coordinate systems $(x_1, y_1, z_1)$ and $(x_2, y_2, z_2)$ associated with of the respective items of footwear 110 and 115 are not necessarily aligned to two common planes. For example, when the items of footwear are at different elevations, the $(x_1, y_1, z_1)$ coordinate system is offset from the $(x_2, y_2, z_2)$ coordinate system by at least two translations. For another example, when the items of footwear are pointing in different directions, the $(x_1, y_1, z_1)$ coordinate system is offset from the $(x_2, y_2, z_2)$ coordinate system by at least one translation and one rotation. In such cases, the first item of footwear 110 generates a vector $V_{1-2}$ to the second item of footwear 115 in the $(x_1, y_1, z_1)$ coordinate system of the first item of footwear 110. Similarly, the second item of footwear 115 generates a vector $V_{2-1}$ to first item of footwear 110 in the $(x_2, y_2, z_2)$ coordinate system of the second item of footwear 115. The magnitude of these two vectors (length) is the same, so an average is taken to minimize noise and errors. The mathematical transformation for one vector to the other vector indicates the orientation of one item of footwear with respect to the other item of footwear. Therefore, the processor in one item of footwear can determine where the other item of footwear is, and in what direction the other item of footwear is pointing. This is the advantage of bidirectional trilateration over unidirectional trilateration described above with reference to FIG. 2.

Figure 4A:
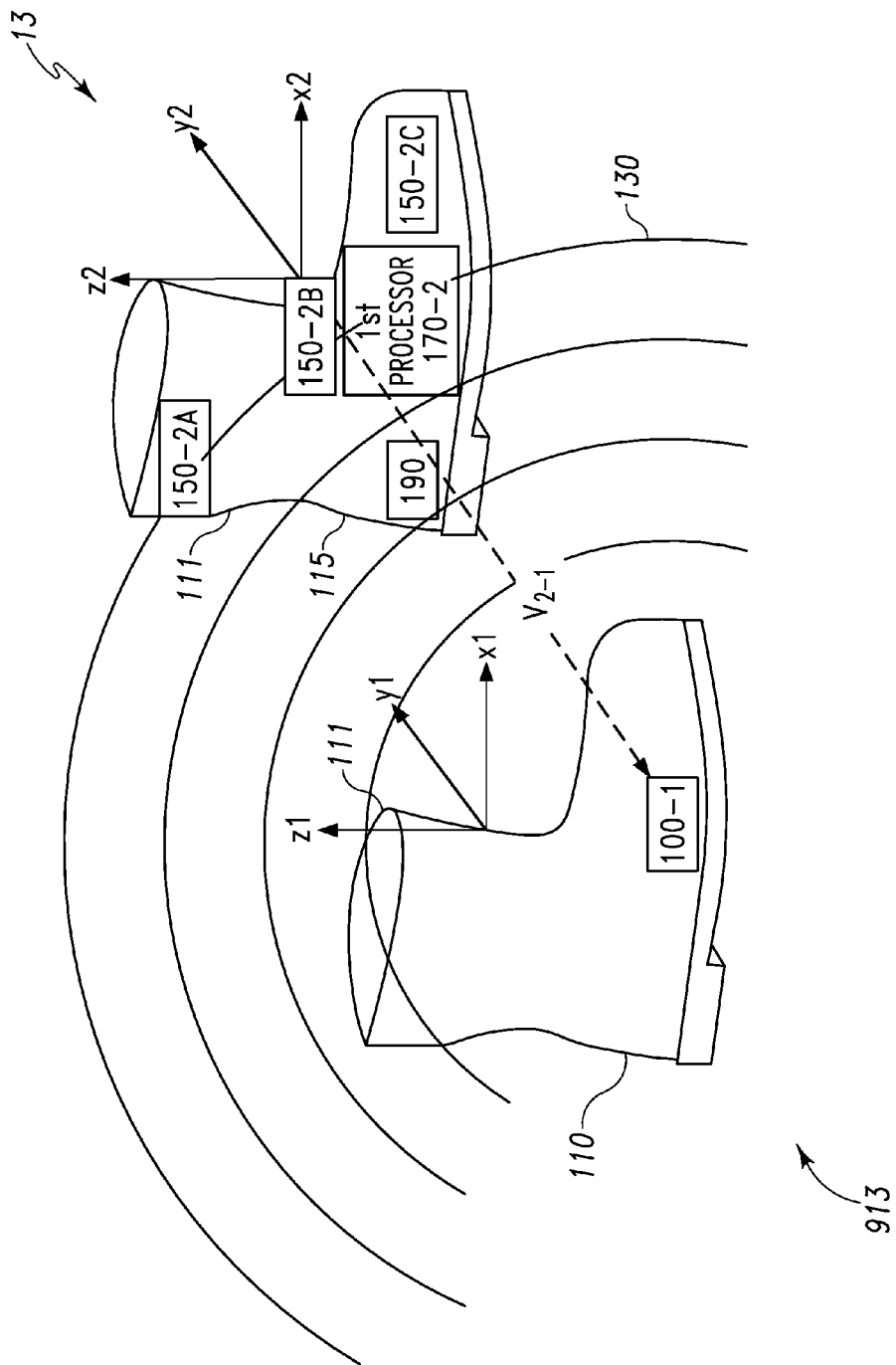
FIG. 4A illustrates an ultrasonic unidirectional multilateration system for stride vectoring according to one embodiment.

FIG. 4A illustrates an ultrasonic unidirectional multilateration system 13 for stride vectoring according to one embodiment. The ultrasonic unidirectional multilateration system 13 is also referred to herein as personal navigation system 13. The position measurement system 913 includes the personal navigation system 13 and the pair of footwear 111. The ultrasonic unidirectional multilateration system 13 differs from the ultrasonic unidirectional trilateration system 11 of FIG. 2 in that there are at least four ultrasonic receivers 150-2(A-D) attached to the second item of footwear 115. Since there are four ultrasonic receivers 150-2(A-D), the time-difference-of-arrival (TDOA) is measured between receiver pairs as described above. The three receiver pairs in FIG. 4A include the pair 150-2A/150-2B, the pair 150-2C/150-2B, and the pair 150-2D/150-2B.

Figure 4B:
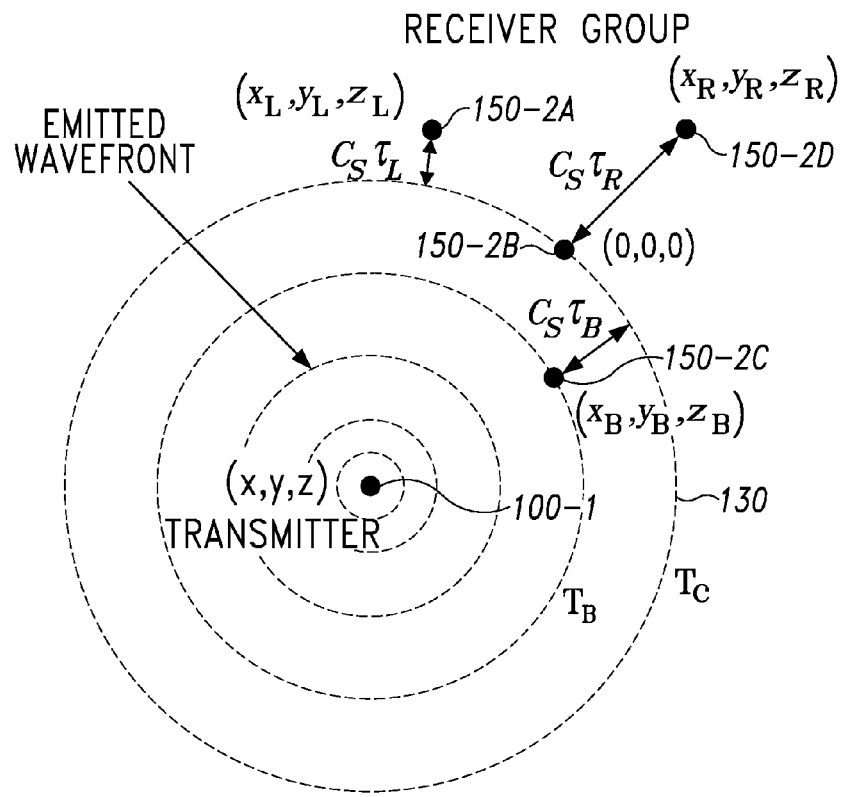
FIG. 4B is a schematic diagram showing how multilateration is used in the determination of transmitter position.

FIG. 4B is a schematic diagram showing how multilateration is used in the determination of transmitter position. As shown in FIG. 4B, the transmitter 100-1 emits an ultrasonic wavefront 130 that travels to each of ultrasonic receivers 150-2(A-D). TDOA measurements between receiver pairs are used to locate the position of transmitter 100-1. The TDOA measurements between receiver pairs are indicated as $c_s \tau_L$ for the TDOA between receivers 150-2A and 150-2B, $c_s \tau_B$ for the TDOA between receivers 150-2C and 150-2B, and $c_s \tau_R$ for the TDOA between receivers 150-2D and 150-2B.

The TDOA measurements depend on the travel time ($T_L$, $T_R$, $T_B$ and $T_C$) of pulses from the ultrasonic transmitter to each ultrasonic receiver location, which is the pulse distance traveled divided by the pulse propagation rate $c_s$.

The receiver 150-2B is used as the coordinate system origin (0, 0, 0). Each of the three TDOA measurements locates transmitter 100 on a separate hyperboloid surface. The location of transmitter 100-1 is determined by the intersection of the three hyperboloid surfaces which are satisfied by the three equations $\tau_L$, $\tau_R$, and $\tau_B$ as set forth in FIG. 4B.

The present ultrasonic multilateration system has millimeter resolution over a few meters. The TDOA measurements only require the receivers to be synchronized rather than the transmitter and receivers. In one implementation, the TDOA measurements can be about 10 μs at 1 m in air, assuming about 10 cm (about 4 inches) of receiver separation.

To achieve sub-millimeter accuracy, a high frequency of operation for the ultrasonic transmitter and receivers can be set in the range from about 100 kHz to about 500 kHz, with about 250 kHz as the expected frequency. This particular frequency range, although not often used in air-coupled acoustics, offers significant benefits for use in a personal navigation system. This frequency range is reasonably insensitive to changes in humidity, and has a short wavelength of about 1.5 mm at 250 kHz, making it suitable for ranging with sub-mm accuracy. In addition, the atmospheric absorption coefficient (9 dB/m at 250 kHz) conveys sizable advantages and is only moderately problematic at distances of the human gait (about 1 m). Benefits of atmospheric absorption include suppression of long time-of-flight echoes that may confuse the system, suppression of interference from other nearby systems, and complete signature masking at tactically significant ranges (greater than 20 m).

Initially, the inertial measurement unit 190 (FIG. 4A) is calibrated and the calibration is sent to the processor 170-2. Over time, the inertial measurement unit drifts away from its initial calibration, and the ultrasonic multilateration is used to maintain the most accurate navigation solution.

The present ultrasonic multilateration system enables an extremely low power (about 1 mW) for performing stride vector measurements using very compact ultrasonic transmitters and receivers. Additionally, the larger atmospheric absorption coefficient of high frequency ultrasound allows for covert operations and reduced cross-talk between systems.

Figure 5:
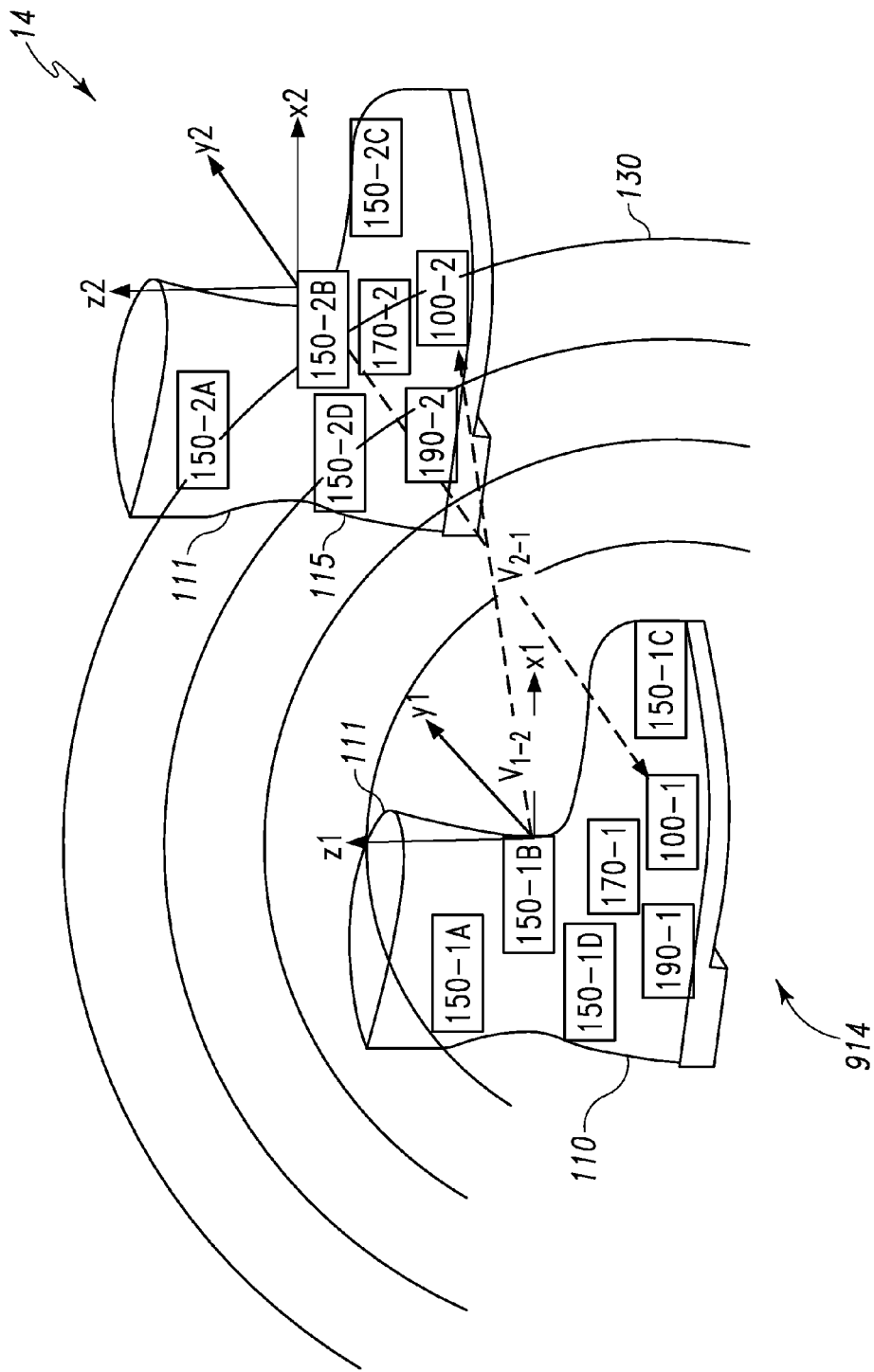
FIG. 5 illustrates an ultrasonic bidirectional multilateration system for stride vectoring and determination of footwear orientation according to one embodiment.

FIG. 5 illustrates an ultrasonic bidirectional multilateration system 14 for stride vectoring and determination of footwear orientation according to one embodiment. The position measurement system 914 includes the ultrasonic bidirectional multilateration system 14 and the pair of footwear 111. The ultrasonic bidirectional multilateration system 14 differs from the ultrasonic unidirectional multilateration system 13 of FIG. 4A in that an ultrasonic transmitter 100-2 is attached to the second item of footwear 115 and four ultrasonic receivers 150-1(A-D) are attached to the first item of footwear 110. The ultrasonic bidirectional multilateration system 14 generates two vectors $V_{1-2}$ and $V_{2-1}$ that operate (as described above with reference to FIG. 3) to determine the orientation of the first item of footwear 110 with respect to the second item of footwear 115. In this embodiment, the vectors $V_{1-2}$ and $V_{2-1}$ are generated by TDOA measurements between pairs of ultrasonic receivers on each item of footwear as described above with reference to FIGS. 4A and 4B. In one implementation of this embodiment, there are four or more ultrasonic transmitters 100-2(A-D) attached to the second item of footwear 115 and four ultrasonic transmitters 100-1(A-D) attached to the second item of footwear 110. Such an embodiment provides additional information about the humidity of the media between the ultrasonic transmitters and ultrasonic receivers, which can be used to more accurately determine the velocity of the pulse propagating from the ultrasonic transmitter to the ultrasonic receiver.

Figure 6:
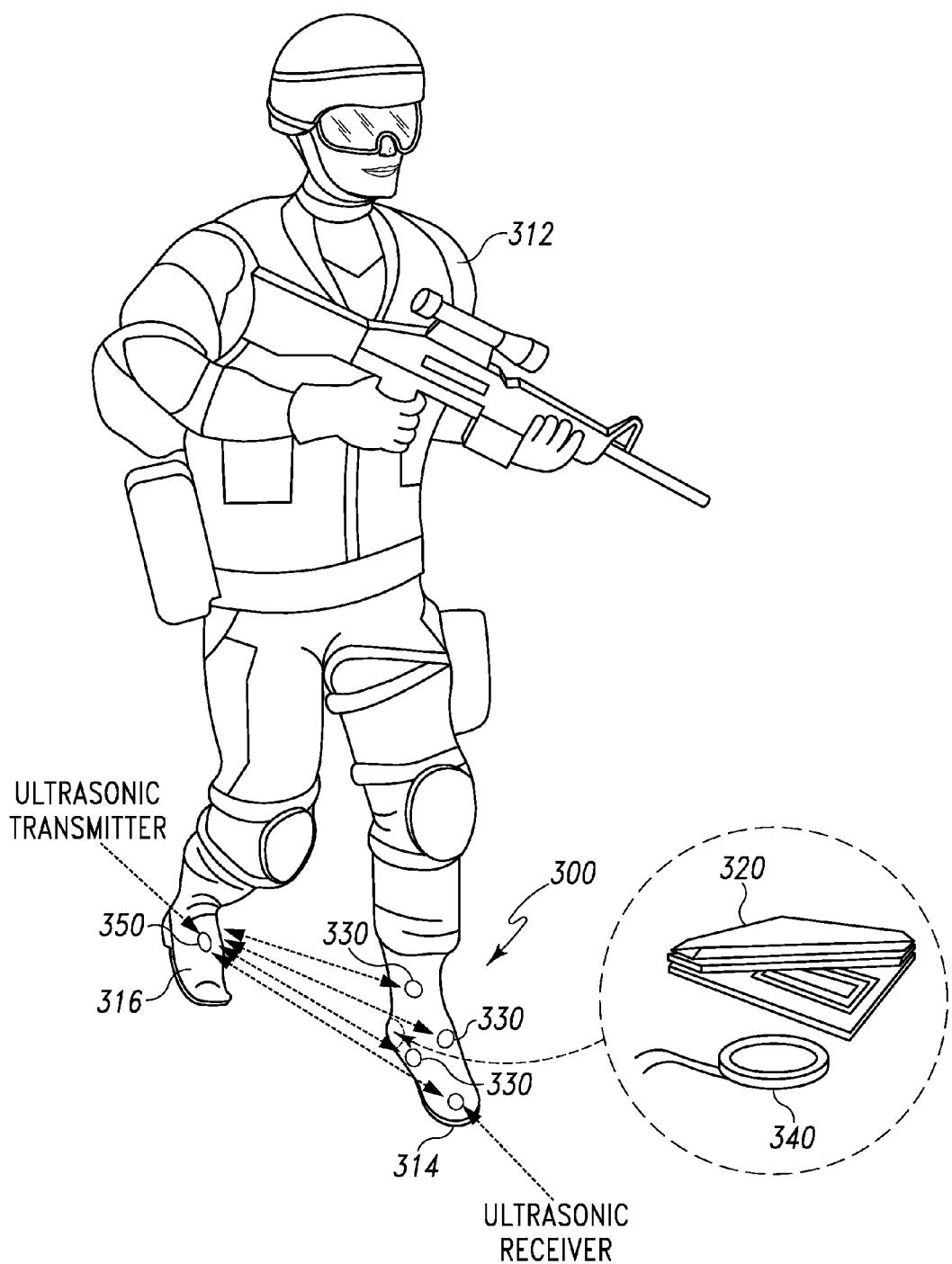
FIG. 6 illustrates a personal navigation system that implements an ultrasonic multilateration system for stride vectoring according to one embodiment.

FIG. 6 illustrates a personal navigation system 300 that implements the present ultrasonic multilateration system for stride vectoring according to one embodiment. The personal navigation system 300 generally includes one or more ultrasonic transmitters, ultrasonic receivers, one or more ground contact switches, a chip-scale inertial sensor assembly (ISA—the hardware portion of an IMU), and GPS. In one embodiment, the ISA can include micro-electro-mechanical systems (MEMS) gyroscopes and accelerometers that are integrated onto a single, six degree-of-freedom (DOF) chip, which is copackaged with a processor such as an application-specific integrated circuit (ASIC) to produce the chipscale ISA. A stride vectoring algorithm and a ZUPT algorithm can be programmed into the ASIC. Optional features for personal navigation system 300 can include a three-dimensional magnetic compass, barometric altimeter, temperature sensor, and motion classification.

As shown in FIG. 6, a user 312 is wearing a left boot 314 containing an inertial measurement unit 320, a plurality of non-collinear ultrasonic receivers 330, and a ground contact pressure switch 340. A right boot 316 of user 312 has an ultrasonic transmitter 350 in operative communication with receivers 330, and a ground contact switch (not shown). Although FIG. 6 illustrates that user 312 is a soldier, it should be understood that system 300 can be used by other types of personnel such as first responders, or consumers.

In an alternative embodiment, a navigation system similar to personal navigation system 300 can be incorporated into the feet of a robot that walks. Such a navigation system for the robot generally includes one or more ultrasonic transmitters, ultrasonic receivers, one or more ground contact switches, one or more IMUs, and a GPS.

Exemplary ground contact switches that can be used in personal navigation system 300 are described in further detail in copending U.S. application Ser. No.12/019,363, and entitled "GROUND CONTACT SWITCH FOR PERSONAL NAVIGATION SYSTEM."

The stride vectoring technique system provides for non-zero-velocity (motion) inertial measurement unit error correction. In stride vectoring, while one foot is stationary and the other foot is moving, the position vector between the two can be measured using the ultrasonic trilateration or multilateration systems, such as unidirectional trilateration system 10, unidirectional personal navigation system 11, bidirectional personal navigation system 12, unidirectional multilateration system 13, and ultrasonic bidirectional multilateration system 14 described above with reference to FIGS. 1, 2, 3, 4A, and 5 respectively.

When the non-inertial-measurement-unit foot (anchor foot) is determined to be stationary, the system performs position measurements to the inertial-measurement-unit foot. These position measurements will occur a few times as the inertial-measurement-unit foot swings through its stride (motion update or MUPT). Changes in position of the inertial-measurement-unit foot with respect to the anchor foot are used to provide distance and heading corrections to the inertial measurement unit to compensate for position errors.

When the stride vectoring technique is used in conjunction with a zero velocity update (ZUPT) algorithm, inertial measurement unit corrections can be provided when a user's foot is stationary as well as when the foot is in motion. The inertial measurement unit in the moving foot can be updated during the moving portion of the stride. The ZUPT algorithm corrects inertial measurement unit errors while the foot is stationary. Combining the motion update with ZUPT provides the unique capability of being able to compensate for inertial measurement unit errors during the majority of the inertial-measurement-unit foot stride. This allows for increased performance of a personal navigation system operating in GPS-denied environments.

The stride vectoring technique is described in further detail in copending U.S. application Ser. No. 12/019,363, and entitled "METHOD OF PERSONAL NAVIGATION USING STRIDE VECTORING."

The position information from the stride vectoring can be integrated with a navigation algorithm (e.g., Honeywell's ECTOS IIC software), thereby providing a high accuracy navigation solution in GPS-denied and GPS-limited environments. When accurate stride vectoring information is not available, the multilateration system is still able to provide accurate foot ranging data that can be useful in compensating for inertial measurement unit error growth.

The personal navigation system 300 uses information indicative of a stationary foot in order to determine foot orientation when a bidirectional trilateration or bidirectional multilateration system is used. In an embodiment in which the objects to which the trilateration or multilateration system is attached are never stationary, the trilateration or multilateration systems can be implemented to indicate the relative positions of the objects. In some implementations of such embodiments, the movement of the objects can be coordinated to prevent collision between the objects. Such a system is illustrated in FIG. 7.

Figure 7:
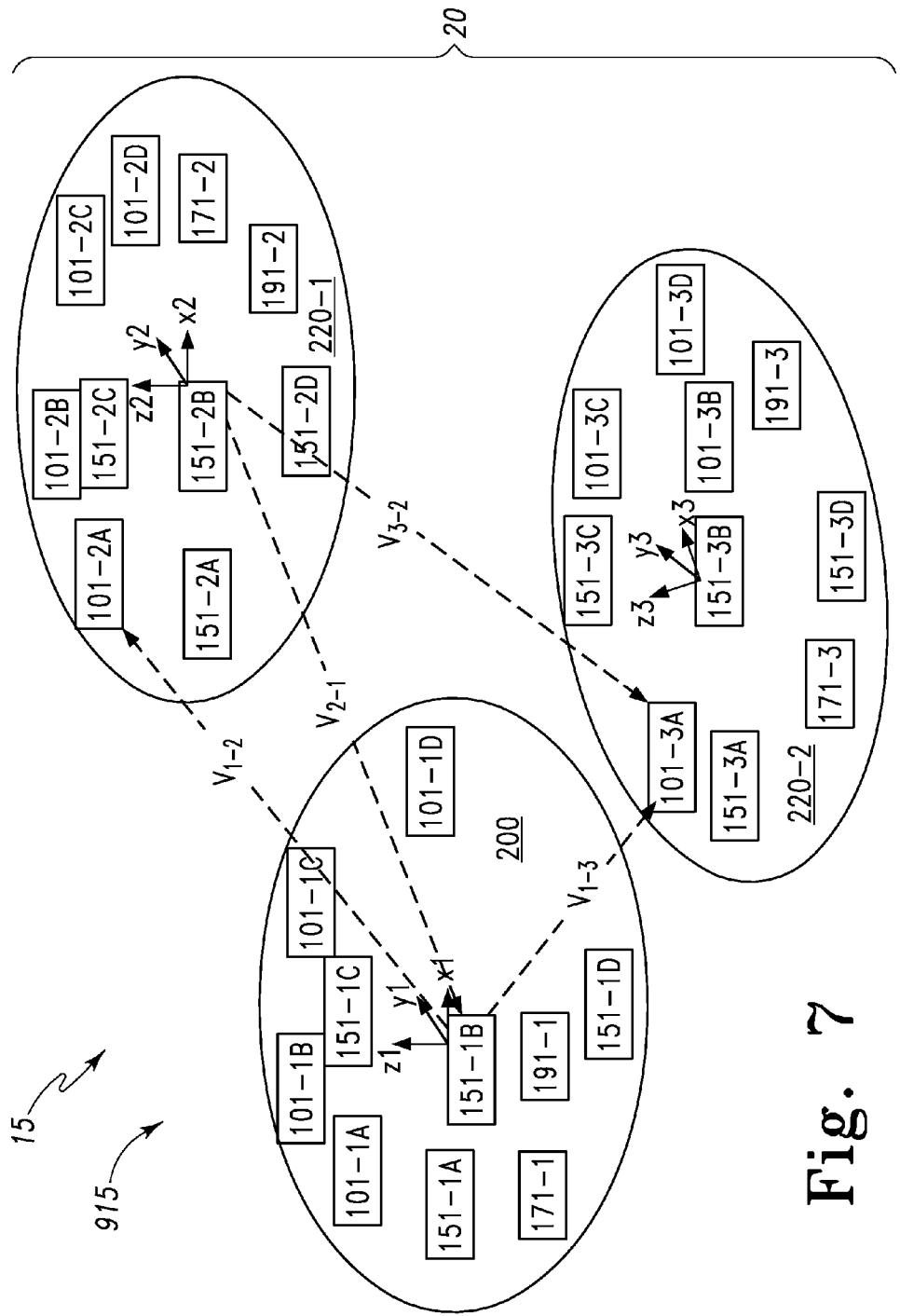
FIG. 7 illustrates a plurality of robotic units that implement an ultrasonic bidirectional multilateration system to coordinate movements among the robotic units according to one embodiment.

FIG. 7 illustrates a plurality of robotic units 200, 220-1 and 220-2 that implement an ultrasonic bidirectional multilateration system 15 to coordinate movements among the robotic units 200, 220-1 and 220-2 according to one embodiment. The position measurement system 915 includes the ultrasonic bidirectional multilateration system 15 and the plurality of robotic units 200, 220-1 and 220-2. The robotic unit 200 is referred to herein as first object 200 and robotic units 220-1 and 220-2 are referred to herein as second objects 220-1 and 220-2. The robotic units 200, 220-1 and 220-2 form a robotic system 20 in which the robotic units 200, 220-1 and 220-2 move in the same general direction in a group. In one implementation of this embodiment, there are N second objects 220-1, 220-2, . . . 220-N. In another implementation of this embodiment, there is only one second object 220. The robotic units 200, 220-1, 220-2, . . . and 220-N can move on land, in water, or in air. In one implementation of this embodiment, the robotic units are unmanned aerial vehicles.

Each robotic unit 200, 220-1, and 220-2 includes four transmitters 101-$i$(A-D), four receivers 151-$i$(A-D), a processor 171-$i$, and an inertial measurement unit 191-$i$, where i indicates the $i^{th}$ robotic unit of the robotic units 200, 220-1, and 220-2. The processors 171-$i$, are communicatively coupled to the four receivers 151-$i$(A-D) and the inertial measurement unit 191-$i$ that are attached to the same $i^{th}$ robotic unit by one or more of a wireless communication link (for example, a radio-frequency (RF) communication link) and/or a wired communication link (for example, an optical fiber or copper wire communication link). The four transmitters 101-$i$(A-D) on one robotic unit 200, 220-1, or 220-2 are communicatively coupled to respective ones of the four receivers 151-$j$(A-D), on another robotic unit 200, 220-1, or 220-2 in a one-to-one configuration as shown for three transmitters and receivers in FIG. 1, where j indicates the $j^{th}$ robotic unit of the robotic units 200, 220-1, and 220-2, which is different form the $i^{th}$ robotic unit.

The four transmitters 101-$i$(A-D), four receivers 151-$j$(A-D), a processor 171-$j$, and an inertial measurement unit 191-$j$ attached to the $i^{th}$ and $j^{th}$ robotic units generate the vectors $V_{i-j}$ as described above with reference to FIG. 5. Four exemplary vectors $V_{1-2}$, $V_{1-3}$, $V_{2-1}$, and $V_{3-2}$ are shown in FIG. 7. In one implementation of this embodiment, the processors 171-$i$, are each communicatively coupled to a Kalman filter (FIG. 1). In one implementation of this embodiment, the processor 170 executes software 120 (FIG. 1) so that the output from the inertial measurement unit 191-$i$ constrains error growth in the generation of the vector $V_{i-j}$. In another implementation of this embodiment, the processor 171-$i$ executes software 120 so that the generation of the vector V constrains error growth in the output from the inertial measurement unit 191-$i$.

The processor 171-$i$ can output instructions to adjust the velocity or direction of the robotic unit 220-$i$ if the vector length of any vector $V_{i-j}$ to another robotic unit 220-$j$ in the robotic system 20 is determined to be less than or equal to a minimum acceptable distance $L_{min}$. Likewise, processor 171-$i$ can execute software 120 (FIG. 1) to adjust the velocity of the robotic unit 220-$i$ if the vector length of any vector $V_{i-j}$ to another robotic unit 220-$j$ in the robotic system 20 is determined to be greater than or equal to a maximum acceptable distance $L_{max}$.

In one implementation of this embodiment, there are three transmitters and three receivers attached to the robotic units, and the ultrasonic bidirectional multilateration system implements trilateration. For example, there are three transmitters 101-$i$(A-C) in each robotic unit 200, 220-1, and 220-2. In another implementation of this embodiment, there are four transmitters in each robotic unit communicatively coupled to respective receivers in the other robotic units. In yet another implementation of this embodiment, the transmitters and receivers are ultrasonic transmitters and ultrasonic receivers.

In yet another implementation of this embodiment, there is an inertial measurement unit in one of the robotic units, such as 200-1, while the remainder of the robotic units, such as 200-2 to 200-N, do not include inertial measurement units. This embodiment is appropriate for a swarm of the robotic units 200(1-N) in which the robotic units, such as 200-2 to 200-N, follow the lead of the first robotic unit 200-1 as it moves by maintaining the distance (absolute value of the vector) between itself and the first robotic unit 200-1 within a range of selected distances. In this case, the vector generated at each robotic unit, such as 200-$i$, is used to maintain a relative position between the first robotic unit 200-1 and the robotic unit 200-$i$. Swarm control of the robotic units 200(1-N) requires ultrasonic components having a range consistent with the maximum distance between units. (i.e., of a different frequency). In yet another implementation of this embodiment, the transmitters and receivers are optical transmitters and receivers. In yet another implementation of this embodiment, the transmitters and receivers are radio frequency transmitters and receivers. Typically, the type of transmitters and receivers is determined by the average desired separation between the robotic units.

Figure 8:
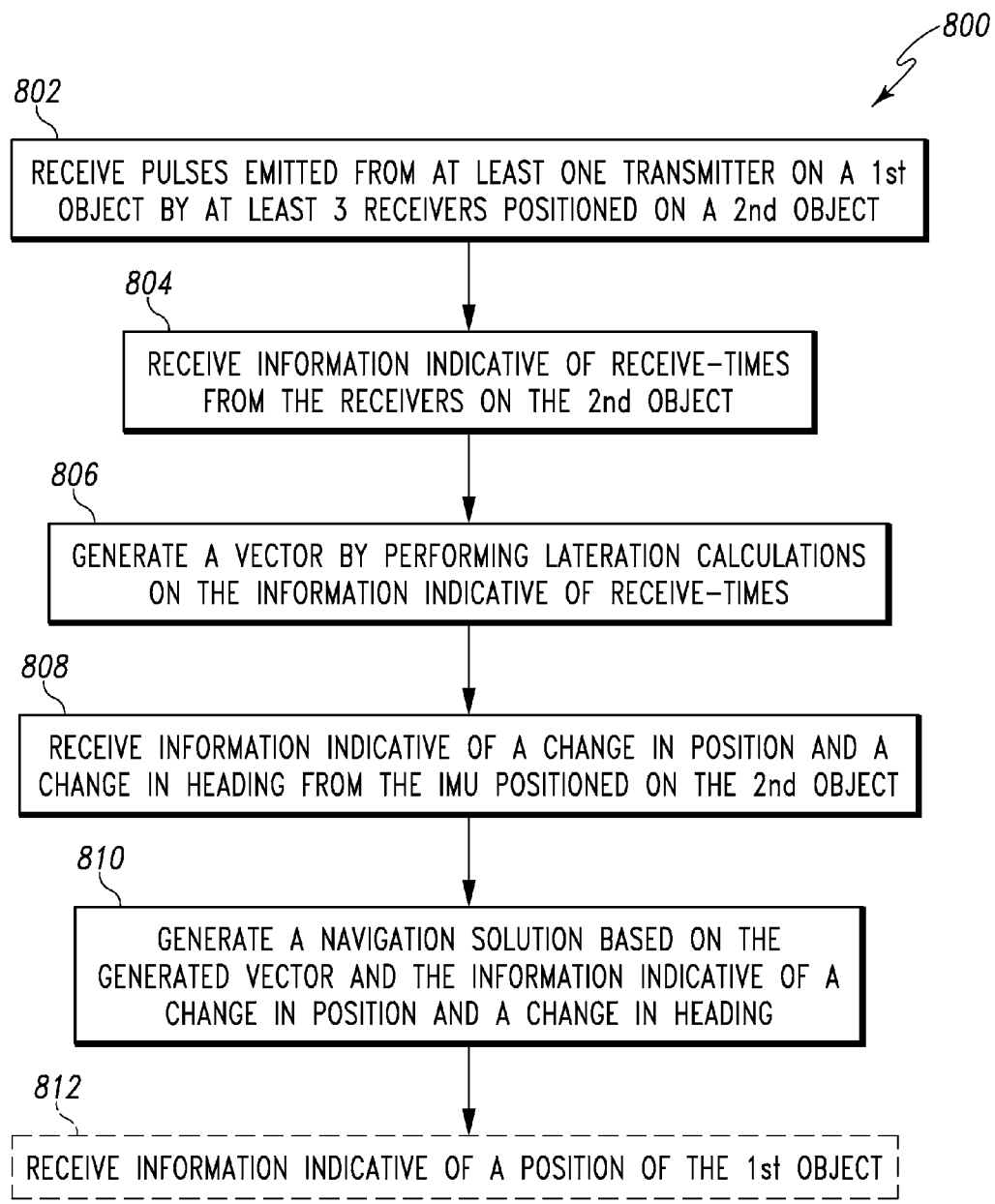
FIG. 8 illustrates a flow diagram of one embodiment of a method of operating a lateration system to determine relative position between or among objects.

FIG. 8 illustrates a flow diagram of one embodiment of a method 800 of operating a lateration system to determine relative position between or among objects. Method 800 can be implemented by embodiments of the unidirectional trilateration system 10, the unidirectional personal navigation system 11, the bidirectional personal navigation system 12, the unidirectional multilateration system 13, the ultrasonic bidirectional multilateration system 14, the personal navigation system 300, and the ultrasonic bidirectional multilateration system 15 described above with reference to FIGS. 1, 2, 3, 4A, 5, 6 and 7 respectively.

In one implementation of this embodiment, the flow of method 800 is implemented several times while a user of the system takes a step. In another implementation of this embodiment, the flow of method 800 is implemented many times per second while robotic units that comprise a robotic system move in tandem with each other. The speed of the robotic units determines the number of times per second that the flow of method 800 is implemented. In one implementation of this embodiment, the inertial measurement unit is calibrated during an initialization process, which is known in the art and is not described herein. The processor initial calibration data is stored at the processors in the system. In another implementation of this embodiment in which the system is being used in a personal navigation system, a sensor or a switch detects that one foot in a boot is at a stationary portion of the step and a sensor or switch sends a signal to a radio frequency transmitter, triggering a brief RF pulse. The RF pulse is received by the other boot and the flow described in method 800 occurs at least once.

Referring to FIG. 8, at block 802, pulses are received from at least one transmitter on a first object by at least three receivers on a second object. At block 804, information indicative of receive-times is received from the receivers on the second object at a processor. The receive-times are the time-of-arrival (TOA) for each receiver. If the lateration system is a trilateration system the processor uses the receive-times in the trilateration calculations. If the lateration system is a multilateration system, the processor uses the receive-times to calculate the time-difference-of-arrival (TDOA) for pairs of receivers. In one implementation of this embodiment, the processor is positioned on the second object. In another implementation of this embodiment, the processor is positioned on a user of the second object.

At block 806, the processor generates a vector by performing lateration calculations on the information indicative of receive-times. The vector indicates the relative position of the first object with respect to the second object. If the processor receives information indicative of receive-times from the at least three receivers and uses that information to calculate TOA for each receiver, then the processor generates the vector by performing trilateration calculations on the information indicative of receive-times. If the processor receives information indicative of receive-times from pairs of the at least four receivers and uses that information to calculate TDOA for each pair of receivers, then the processor generates the vector by performing multilateration calculations on the information indicative of receive-times.

At block 808, the processor receives information indicative of a change in position and a change in heading from an inertial measurement unit positioned on the second object. In one implementation of this embodiment, the first and second objects are items of footwear worn by a user, and the processor receives information indicative of a change in position and a change in heading from an inertial measurement unit positioned on the item of footwear in motion. In another implementation of this embodiment, the first and second objects are items of footwear worn by a user, and the processor receives information indicative of a change in position and a change in heading from an inertial measurement unit positioned on the user.

At block 810, the lateration system generates a navigation solution based on the length and the direction of the vector and the information indicative of the change in position and a change in heading received at block 808. In one implementation of this embodiment, the processor executes a Kalman filter, which filters the length and direction of the vector and the information indicative of the change in position and a change in heading to generate corrections to the navigation solution. In one implementation of this embodiment, the navigation solution provides a latitude, longitude, and altitude of the at least one item of footwear. In another implementation of this embodiment, the navigation solution provides information indicative of a location of the item of footwear.

In one implementation of this embodiment, the corrections to the navigation solution are used by the processor to correct for errors in the inertial measurement unit. In this case, the processor uses the generated vector to constrain error growth in the output from the inertial measurement unit. In another implementation of this embodiment, the corrections to the navigation solution are used by the processor to correct for errors in the vector calculation. In this case, the processor uses the output from the inertial measurement unit to constrain error growth in the generated vector.

Block 812 is optionally implemented in systems in which the first and second objects each momentarily stop, so that a global positioning system (or other position measuring device) can obtain a momentary position. At block 812, the processor receives information indicative of a position of the first object from the position measuring device. The information indicative of position of the first object can be sent to the processor in the second object via a radio frequency transceiver system attached to the first and second objects. When block 812 is implemented, the actual position (e.g., the longitude, latitude, and elevation) of the second object can be determined based on the known position of the first object and the relative position of the first object with respect to the second object.

Figure 9:
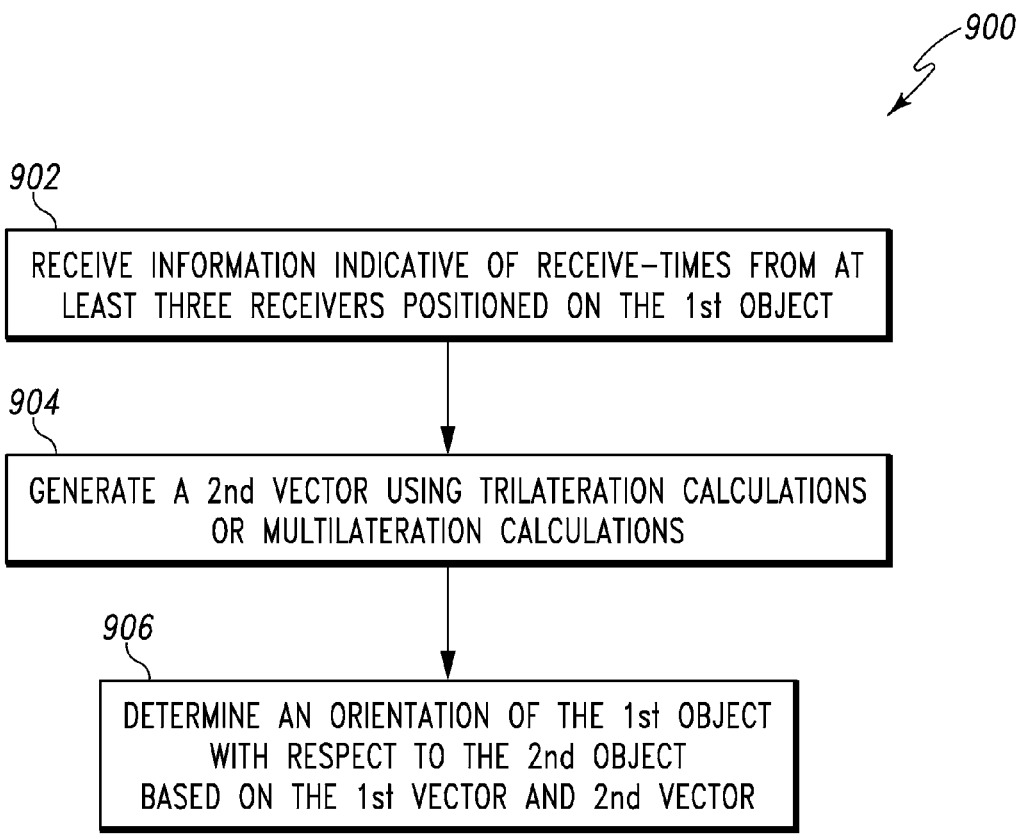
FIG. 9 illustrates a flow diagram of one embodiment of a method of operating a lateration system to determine the orientation of one object with respect to another object.

FIG. 9 illustrates a flow diagram of one embodiment of a method 900 of operating a lateration system to determine the orientation of one object with respect to another object. Method 900 can be implemented by embodiments of the bidirectional personal navigation system 12, the ultrasonic bidirectional multilateration system 14, and the ultrasonic bidirectional multilateration system 15 described above with reference to FIGS. 3, 5, and 7 respectively.

In one implementation of this embodiment, the flow of method 900 is implemented several times while a user of the system takes a step. In this case the first and second objects are a first item of footwear and a second item of footwear, respectively. In another implementation of this embodiment, the flow of method 900 is implemented many times per second while robotic units that comprise a robotic system move in tandem with each other. The average speed of the user or the robotic units determines the number of times per second that the flow of method 900 is implemented.

At block 902, information indicative of receive-times is received from at least three ultrasonic receivers positioned on the first object at a processor on the first object. At block 904, a second vector is generated by performing lateration calculations on the information indicative of receive-times received from the first object by the processor. If the processor receives information indicative of receive-times from the at least three receivers positioned on the first object, and uses that information to calculate TOA for each receiver, then the processor generates the second vector by performing trilateration calculations on the information indicative of receive-times from the at least three receivers positioned on the first object. If the processor receives information indicative of receive-times from pairs of the at least four receivers positioned on the first object and uses that information to calculate TDOA for each pair of receivers, then the processor generates the second vector by performing multilateration calculations on the information indicative of receive-times received from the at least four receivers positioned on the first object.

At block 906, the orientation of the first object with respect to the second object is determined based on the first vector and second vector. In one implementation of this embodiment, the processor on the first object makes the determination of orientation. In another implementation of this embodiment, the processor on the second object makes the determination of orientation. In yet another implementation of this embodiment, the processors on both the first and second object make the determination of orientation. In yet another implementation of this embodiment, a processor is not on either the first or second object but is communicatively coupled to receive the receive-times from the receivers.

In one implementation of this embodiment, the ultrasonic transmitters are replaced by optical transmitters or radio frequency transmitters to emit respective optical pulses and radio frequency pulses. Since the optical or RF signal travels at the speed of light, which is faster than the propagation velocity of the ultrasonic pulse by about three orders of magnitude, the time it takes for the pulse to get from one object to another object can be small (depending on the distance between the objects) and the difference in the TOA and the TDOA becomes very small. As the technology for detecting improves in the future, the multilateration systems can implement optical and radio frequency technologies in the manner described herein.

In another implementation of this embodiment, additional sensors are included in the embodiments of the lateration systems described herein to detect the media that is carrying the ultrasonic pulse. As the media changes the velocity of the ultrasonic pulse changes. For example, as a soldier walks from dry land into a body of water, the velocity of the ultrasonic pulse decreases. In this embodiment, the media sensing detectors can detect the change in media and send information indicative of the change to the processor. The processor will adjust the velocity of ultrasonic pulse that is used in the lateration calculations to accommodate the change in media. In another implementation of this embodiment, sophisticated signal processing techniques are implemented to provide corrections to the velocity of the ultrasonic pulse.

In another implementation of this embodiment, a temperature sensor on both items of footwear can determine the speed of sound in air using a simple temperature model. Since there is a slight dependence of the speed of sound on humidity, differences between the temperatures at each boot could also be used to compensate for any temperature gradient between the two feet to a linear approximation. In yet another implementation of this embodiment, a radio frequency timing system can be included in the multilateration system to actively measure the speed of sound to a reasonable degree of accuracy by emitting test pulses and timing their arrival between the items of footwear or the robotic units.

If additional sensors are implemented, the output from these sensors can be blended in the processor via Kalman filtering along with the stride vector information and the information indicative of change in position and change in heading from the inertial measurement unit to produce an optimal navigation solution.

In one implementation of this embodiment, a very low cost navigation system is implemented based on the stride vector system alone (without the use of the inertial measurement unit). In this case, the multilateration system navigates without the use of an inertial measurement unit by adding successive stride vectors.

In yet another implementation of this embodiment, five or more ultrasonic receivers are used in the multilateration system. Since an exact solution of the multilateration (TDOA) is only possible for the case of 4 receivers, if additional receivers are implemented, the equations must be numerically solved.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A lateration system, the system comprising;
   at least one transmitter attached to a first object and configured to emit pulses;
   three or more receivers attached to at least one second object and configured to receive the pulses emitted by the transmitter; and
   a processor configured to process information received from the three or more receivers, and to generate a vector based on lateration, wherein lateration is one of multilateration and trilateration, wherein the vector is used by the processor to constrain error growth in a position measurement system.

2. The system of claim 1, where the transmitter is an ultrasonic transmitter and the receivers are ultrasonic receivers operably positioned to receive ultrasonic pulses emitted by the ultrasonic transmitter.

3. The system of claim 2, further comprising an inertial measurement unit configured to measure a change in position and a change in heading of the first object, the inertial measurement unit further configured to output information indicative of the change in position and the change in heading to the processor.

4. The system of claim 3, wherein the lateration system generates a navigation solution based on the generated vector and the information indicative of a change in position and a change in heading.

5. The system of claim 3, further comprising a Kalman filter stored on a storage medium, wherein the processor executes the Kalman filter to filter vector information with the information indicative of a change in position and a change in heading so that the output from the inertial measurement unit constrains error growth in the generation of the vector.

6. The system of claim 3, further comprising a Kalman filter stored on a storage medium, wherein the processor executes the Kalman filter to filter vector information with the information indicative of a change in position and a change in heading so that the generation of the vector constrains error growth in the output from the inertial measurement unit.

7. The system of claim 3, wherein the first object is a first item of footwear and the at least one second object is a second item of footwear, the first and second item of footwear forming a pair of footwear, wherein the ultrasonic transmitter is positioned on the first item of footwear and the ultrasonic receivers are positioned on the second item of footwear, wherein each ultrasonic receiver is communicatively coupled to receive ultrasonic pulses from the ultrasonic transmitter.

8. The system of claim 7, wherein the at least one ultrasonic transmitter is a first ultrasonic transmitter, and the vector is a first vector, the system further comprising:
   at least one second ultrasonic transmitter positioned on the second item of footwear; and
   three or more additional ultrasonic receivers positioned on the first item of footwear, wherein each additional ultrasonic receiver is communicatively coupled to receive ultrasonic pulses from a respective one of the at least one second ultrasonic transmitter, wherein the processor is further configured to process the information received from the three or more additional ultrasonic receivers, and to generate a second vector based on lateration, wherein the second vector is used by the processor to constrain error growth in the position measurement system, and wherein the first vector and the second vector are used by the processor to determine an orientation of the first item of footwear with respect to the second item of footwear.

9. The system of claim 1, wherein the processor is a second processor positioned in each at least one second object, and wherein each at least one transmitter is a first transmitter, the system further comprising:
   a first inertial measurement unit positioned in the first object, and the first inertial measurement unit configured to measure a change in position and a change in heading of the first object, the first inertial measurement unit further configured to output information indicative of the change in position and the change in heading to at least one first processor;
   at least one second inertial measurement unit positioned in a respective second object, and the at least one second inertial measurement unit configured to measure a change in position and a change in heading of the respective second object, the second inertial measurement unit further configured to output information indicative of the change in position and the change in heading to a second processor positioned in the respective second object;
   one or more second transmitters attached to the at least one second object, the one or more second transmitters configured to emit pulses; and
   three or more additional receivers attached to the first object, each additional receiver communicatively coupled to receive pulses emitted by the at least one second transmitter;
   the at least one first processor positioned in the first object, the first processor configured to process the information received from the three or more additional receivers attached to the first object, and to generate a vector based on lateration,
   wherein the vector generated by the first processor constrains error growth in a navigation solution of the first object,
   wherein the vector generated in each at least one second object constrains error growth in a navigation solution of the respective second object.

10. The system of claim 1, wherein the first and second objects comprise one of robot feet and robotic units.

11. The system of claim 1, wherein the position measurement system measures a relative position between the first object and the second object.

12. The system of claim 1, wherein the position measurement system measures an absolute position of at least one of the first object and the second object.

13. A method of operating a lateration system, the method comprising:
    receiving pulses emitted from at least one transmitter on a first object by at least three receivers positioned on at least one second object;
    receiving information indicative of receive-times from the at least three receivers positioned on the at least one second object;
    generating a vector by performing lateration calculations on the information indicative of receive-times, wherein the lateration is one of trilateration and multilateration;
    receiving information indicative of a change in position and a change in heading from an inertial measurement unit positioned on at least a portion of the lateration system;
    generating a navigation solution based on the generated vector and the information indicative of a change in position and a change in heading; and
    using the generated vector to constrain error growth.

14. The method of claim 13, wherein using the generated vector to constrain error growth comprises:

using the generated vector to constrain error growth in an output from the inertial measurement unit.

15. The method of claim 13, wherein using the generated vector to contrain error growth comprises:
using an output from the inertial measurement unit to constrain error growth in the generated vector.

16. The method of claim 13, wherein receiving information indicative of receive-times from the at least three receivers on the second object comprises receiving information indicative of receive-times from three ultrasonic receivers on the second object, and wherein generating a vector using lateration comprises generating a first vector using trilateration, the method further comprising:
receiving information indicative of receive-times from three ultrasonic receivers positioned on the first object;
generating a second vector by performing trilateration calculations on the information indicative of receive-times received from the three ultrasonic receivers positioned on the first object; and
determining an orientation of the first object with respect to the second object based on the first vector and second vector.

17. The method of claim 13, wherein receiving information indicative of receive-times from the at least three receivers on at least one second object comprises:
receiving information indicative of TDOA receive-times from at least four ultrasonic receivers on the second object, and wherein generating a vector using lateration comprises generating a first vector using multilateration, the method further comprising;
receiving information indicative of TDOA receive-times from at least four ultrasonic receivers positioned on the first object;
generating a second vector by performing multilateration calculations on the information indicative of receive-times received from the at least four ultrasonic receivers positioned on the first object; and
determining an orientation of the first object with respect to the second object based on the first vector and second vector.

18. A personal navigation system comprising:
at least one ultrasonic transmitter operably attached to a first item of footwear;
at least three ultrasonic receivers operably attached to a second item of footwear, wherein the first item of footwear and the second item of footwear form a pair of footwear, the at least three ultrasonic receivers operably positioned to receive ultrasonic pulses emitted by the ultrasonic transmitter;
an inertial measurement unit configured to generate information indicative of a change in position and a change in heading of at least one item of footwear; and
a processor configured to receive information indicative of a receive-time from each of the at least three ultrasonic receivers and configured to use lateration to generate a vector between the first object and the second object based the information received from the ultrasonic receivers in order to constrain error growth in the inertial measurement unit, wherein lateration is one of multilateration and trilateration.

19. The personal navigation system of claim 18, further comprising:
at least one ultrasonic transmitter operably attached to the second item of footwear; and
at least three additional ultrasonic receivers operably attached to the first item of footwear, the at least three additional ultrasonic receivers operably positioned to receive ultrasonic pulses emitted by the second ultrasonic transmitter, wherein the processor is further configured to receive information indicative of a receive-time from each of the at least three additional ultrasonic receivers and configured to use lateration to generate a vector between the first object and the second object based the information received from the additional ultrasonic receivers in order to determine an orientation of the first item of footwear with respect to the second item of footwear.

20. The personal navigation system of claim 19, wherein the at least one ultrasonic transmitter comprises four ultrasonic transmitters operably attached to the first item of footwear, and wherein the at least three ultrasonic receivers comprise four ultrasonic receivers operably attached to the second item of footwear, the personal navigation system further comprising:
four ultrasonic transmitters operably attached to the second item of footwear; and
four ultrasonic receivers operably attached to the first item of footwear, wherein the lateration is multilateration.

* * * * *